(12) United States Patent
De Andrade Filho et al.

(10) Patent No.: US 8,474,419 B2
(45) Date of Patent: Jul. 2, 2013

(54) TEMPERATURE CONTROL APPARATUS AND METHOD FOR AN AUTOMOTIVE COOLING SYSTEM

(75) Inventors: Ayres Pinto De Andrade Filho, Sao Paulo (BR); Joao Luiz de Carvalho Meira, Sao Paulo (BR); Edgard Ferraz, Sao Paulo (BR); Eduardo Gubbiotti Ribeiro, Sao Paulo (BR)

(73) Assignee: Melling do Brasil Componentes Automotivos Ltds., Sao Paulo (BR)

( * ) Notice: Subject to any disclaimer, the term of this patent is extended or adjusted under 35 U.S.C. 154(b) by 311 days.

(21) Appl. No.: 12/999,647

(22) PCT Filed: Jun. 17, 2008

(86) PCT No.: PCT/IB2008/001574
§ 371 (c)(1),
(2), (4) Date: Dec. 17, 2010

(87) PCT Pub. No.: WO2009/153612
PCT Pub. Date: Dec. 23, 2009

(65) Prior Publication Data
US 2011/0100619 A1    May 5, 2011

(51) Int. Cl.
*F02F 1/14*    (2006.01)
*F01P 1/06*    (2006.01)
*F01P 3/14*    (2006.01)
*F01P 7/14*    (2006.01)

(52) U.S. Cl.
USPC ................... 123/41.8; 123/41.08; 123/41.77; 123/41.85

(58) Field of Classification Search
USPC ................. 123/41.08, 41.77, 41.85
See application file for complete search history.

(56) References Cited

U.S. PATENT DOCUMENTS

| | | | | |
|---|---|---|---|---|
| 4,334,515 A | * | 6/1982 | Otsuka | 123/568.31 |
| 4,399,775 A | * | 8/1983 | Tanaka et al. | 123/41.08 |
| 4,875,437 A | * | 10/1989 | Cook et al. | 123/41.1 |

(Continued)

FOREIGN PATENT DOCUMENTS

| | | |
|---|---|---|
| DE | 1211450 | 2/1966 |
| DE | 2438590 | 2/1976 |

(Continued)

*Primary Examiner* — Lindsay Low
*Assistant Examiner* — Charles Brauch
(74) *Attorney, Agent, or Firm* — Young Basile Hanlon & MacFarlane P.C.

(57) ABSTRACT

A temperature control valve 10 for regulating the flow of coolant 15 in an automotive cooling system 11 that includes an engine 12 and a radiator 14. The temperature control valve 10 includes a valve body 40 having an inlet 42 and an outlet 46, a first valve assembly 100 that is movable between a closed position and an open position, and a chamber 74 that is adjacent to the first valve assembly 100. In the closed position of the first valve assembly 100, the inlet 42 of the valve body 100 is not in fluid communication with the outlet 46 of the valve body 100. In the open position of the first valve assembly 100, the inlet 42 of the first valve assembly 100 is in fluid communication with the outlet 46 of the first valve assembly 100. Fluid pressure within the chamber 74 is operable to move the first valve assembly 100 between the open position and the closed position. The temperature control valve 10 may include a second valve assembly 130 that is configured to regulate fluid pressure within the chamber 74 to thereby move the first valve assembly 100 between the open position and the closed position.

18 Claims, 6 Drawing Sheets

U.S. PATENT DOCUMENTS

| | | | |
|---|---|---|---|
| 5,402,815 A * | 4/1995 | Hoch et al. | 137/80 |
| 5,758,607 A | 6/1998 | Brendel et al. | |
| 5,899,434 A * | 5/1999 | Nishimura | 251/30.02 |
| 5,975,031 A | 11/1999 | Bartolazzi | |
| 6,105,607 A * | 8/2000 | Caise et al. | 137/487.5 |
| 6,223,700 B1 | 5/2001 | Sano et al. | |
| 6,422,181 B1 | 7/2002 | Ovari | |
| 6,668,764 B1 | 12/2003 | Henderson et al. | |
| 6,668,766 B1 | 12/2003 | Liederman et al. | |
| 6,749,173 B2 * | 6/2004 | Heiling | 251/30.03 |
| 7,011,049 B2 | 3/2006 | Tomasseli et al. | |
| 7,036,745 B2 * | 5/2006 | Bouloy et al. | 236/101 R |
| 2001/0035137 A1 * | 11/2001 | Hollis | 123/41.1 |
| 2006/0162676 A1 * | 7/2006 | Pegg et al. | 123/41.1 |
| 2006/0162677 A1 | 7/2006 | Piddock et al. | |

FOREIGN PATENT DOCUMENTS

| | | |
|---|---|---|
| GB | 2139322 | 11/1984 |
| JP | 11022465 | 1/1999 |
| JP | 2004156490 | 6/2004 |

* cited by examiner

TEMPERATURE CONTROL APPARATUS AND METHOD FOR AN AUTOMOTIVE COOLING SYSTEM

FIELD OF THE INVENTION

The present invention relates to the field of fluid flow control valves, and in particular, a temperature control valve and method for controlling the flow of liquid coolant in an automotive cooling system.

BACKGROUND OF THE INVENTION

It is known to use a fluid flow control valve in an automotive cooling system to regulate the flow of coolant and thereby regulate the operating temperature of the engine of the automobile.

One class of conventional fluid flow control valves for automotive cooling systems employs a wax element that is sensitive to coolant temperature to regulate the opening and closing of the fluid flow control valve thereby regulating the flow of coolant through the automotive cooling system. However, due to the nature of the wax element, this type of system is slow to respond to changes in the temperature of the engine. Furthermore, since the opening and closing of the valve is controlled by the thermal properties of the wax used in the valve, the operating temperature range in which the engine is controlled cannot be easily adjusted.

Other systems employ temperature sensors that are used to detect the temperature of the engine. The fluid flow control valve is then regulated based on the sensed temperature of the engine using a valve that is electrically-driven, for example, by a stepper motor. While these systems respond quickly to changing engine temperature, the electrically-operated valves employed in these systems are prohibitively expensive.

In some automobiles, it may be necessary to operate the engine of the automobile in different temperature ranges depending upon an operating mode of the automobile. For example, in flex-fuel vehicles, which include engines adapted to use two or more different types of fuel, the different types of fuel burn at different temperatures, and thus, the operating temperature range of the engine must be adjusted based on the type of fuel. However, known systems have not provided a practical means by which the temperature range in which the engine is regulated may be changed in response to an operating mode of the engine.

It would be desirable to have an inexpensive, electrically-operated temperature control valve for an automotive cooling system that provides good response characteristics, is inexpensive, and allows the temperature range of the engine to be changed based on an operating condition of the engine.

SUMMARY OF THE INVENTION

The invention provides a temperature control valve for regulating the flow of coolant in an automotive cooling system that includes an engine and a radiator. The temperature control valve includes a valve body having an inlet and an outlet, a first valve assembly that is movable between a closed position and an open position, and a chamber that is adjacent to the first valve assembly. In the closed position of the first valve assembly, the inlet of the valve body is not in fluid communication with the outlet of the valve body. In the open position of the first valve assembly, the inlet of the first valve assembly is in fluid communication with the outlet of the first valve assembly. Furthermore, fluid pressure within the chamber is operable to move the first valve assembly between the open position and the closed position. The temperature control valve may further include a second valve assembly that is configured to regulate fluid pressure within the chamber to thereby move the first valve assembly between the open position and the closed position.

A first flow port and a second flow port may be formed in the valve body. The first flow port provides fluid communication between the inlet of the valve body and the chamber, while the second flow port provides fluid communication between the outlet and the second valve assembly. Furthermore, the second valve assembly is movable between a closed position, wherein the chamber is not in fluid communication with the outlet through the second flow port, and an open position, wherein the chamber is in fluid communication with the outlet through the second flow port.

The first valve assembly may have a first side adjacent to the inlet and the outlet and a second side adjacent to the chamber. Furthermore, the first valve assembly may include a flexible diaphragm.

The second valve assembly may include an electrically-operated valve. Furthermore, the temperature control valve may include a temperature sensor to detect the temperature of the engine and provide a temperature signal, as well as an electrical control unit in electrical communication with the second valve assembly and the temperature sensor. The electronic control unit is operable to move the second valve assembly between the open and closed positions to control the temperature of the engine in response to the temperature signal provided by the temperature sensor. The temperature control valve may further include a fuel type sensor to detect the type of fuel used by the engine and to provide a fuel type signal. The fuel type sensor is in electrical communication with the electronic control unit, wherein the electronic control unit moves the second valve assembly between the open and closed positions to control the temperature of the engine within either a first operating temperature range or a second operating temperature range, wherein the electronic control unit selects either the first operating temperature range or the second operating temperature range based on the fuel type signal.

BRIEF DESCRIPTION OF THE DRAWINGS

The description herein makes reference to the accompanying drawings wherein like referenced numerals refer to like parts throughout several views and wherein.

DESCRIPTION OF THE PREFERRED EMBODIMENT

Figure 1:
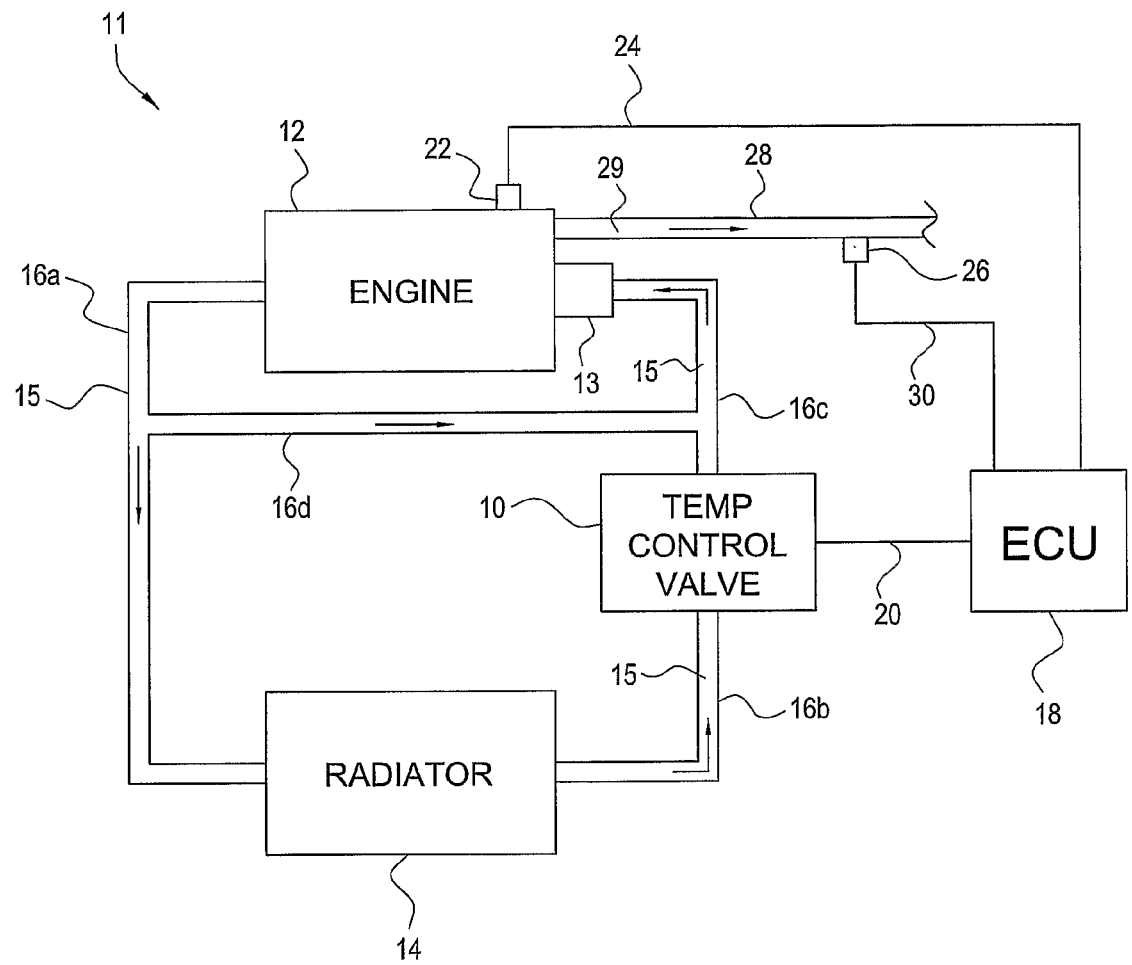
FIG. 1 is a block diagram showing a temperature control valve according to the invention incorporated in an automotive cooling system.

FIG. 1 shows a temperature control valve 10 according to the present invention incorporated in an automotive cooling system 11. The automotive cooling system 11 also includes an engine 12, such as an internal combustion engine, and a radiator 14. The temperature control valve 10 regulates the temperature of the engine 12 by regulating the flow of a liquid coolant 15 between the engine 12 and the radiator 14 in a cooling circuit that is pressurized by a pump 13. For example, the engine 12 may be connected to the radiator 14 by a coolant return line 16a that transmits used liquid coolant 15 to the radiator 14. Once the radiator 14 has cooled the liquid coolant 15, the liquid coolant is discharged from the radiator 14 into a first coolant supply line 16b, where the liquid coolant is direct to the temperature control valve 10. The temperature control valve 10 is further connected to the pump 13 and the engine 12 by a second coolant supply line 16c. Thus, the temperature control valve 10 can regulate the temperature of the engine 12 by moving between a closed position, wherein the liquid coolant 15 is not provided from the radiator 14 to the engine 12, and an open position, wherein the liquid coolant 15 is provided to the engine 12 from the radiator. When the temperature control valve 10 is in the closed position, the liquid coolant 15 is re-circulated to the engine 12 through a coolant recirculation line 16d that is connected to the coolant return line 16a downstream of the engine 12 and is connected to the second coolant line 16c downstream of the temperature control valve 10.

To control the operation of the temperature control valve 10, the automotive cooling system 11 includes an electronic control unit (ECU) 18. The ECU 18 may be implemented by, a microcomputer including a random access memory (RAM), a read-only memory (ROM), and a central processing unit (CPU), in addition to various input and output connections. Generally, the control functions described herein are performed by execution of the CPU of one or more software programs stored in ROM. Of course, some or all of the parts and their associated functions can be implemented by hardware components.

The ECU 18 is electrically connected to the temperature control valve 10 by a communication line 20 over which the ECU 18 transmits signals to the temperature control valve 10 that cause the temperature control valve 10 to move between the open and closed positions. To regulate the temperature of the engine 12 within a desired temperature range, a temperature sensor 22 is provided in thermal communication with the engine 12 and in electrical communication with the ECU 18 by a communication line 24. The temperature sensor 22 transmits signals to the ECU 18 over the communication line 24 corresponding to the temperature of the engine 12. The ECU 18 then transmits signals to the temperature control valve 10, based on the temperature sensed by the temperature sensor 22, to maintain the engine 12 in the predetermined temperature range. Although the temperature sensor 22 is described as directly measuring the temperature of the engine 12 by thermal communication of the temperature sensor 22 with the engine 12, it should be understood that this need not be the case. Rather, the temperature sensor 22 may measure any thermal property associated with the engine 12 that corresponds to the temperature of the engine 12. By way of example, the temperature sensor 22 could be in thermal communication with the liquid coolant 15 in the coolant return line 15a to indirectly measure the temperature of the engine 12 by measuring the temperature of the liquid coolant 15 in the liquid coolant return line 15a.

The ECU 18 may select from one or more temperature ranges in which to control the temperature of the engine 12 based on an operating condition of the engine 12. For example, the ECU 18 may be configured to change the operating temperature range of the engine 12 on the basis of the type of fuel being used by the engine 12 if the engine 12 is a flex-fuel engine that is adapted to operate using two or more different types of fuel, such as gasoline, diesel, bio-diesel, or ethanol. In that case, a fuel type sensor 26 is provided in electrical communication with the ECU 18 over a communication line 30 corresponding to the type of fuel being used by the engine 12. For example, the fuel type sensor 26 may be in communication with exhaust gas 29 flowing through an exhaust system 28 that is connected to the engine 12, wherein the fuel type sensor 26 determines the type of fuel being used by the engine 12 based on the composition of the exhaust gas 29. However, it should be understood that any type of sensor operable to determine a fuel type may be utilized as the fuel type sensor 26. For example, the fuel type sensor 26 could be in direct fluid communication with the fuel to determine the fuel type.

Figure 2:
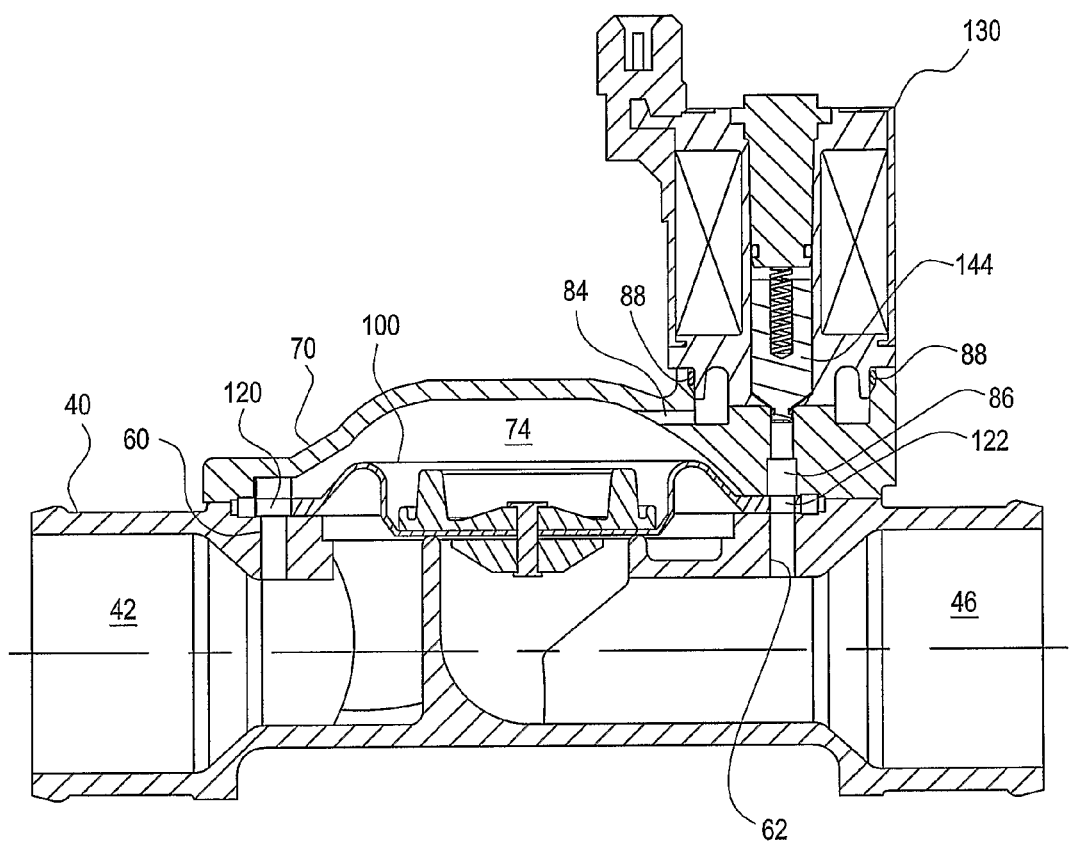
FIG. 2 is a sectional view showing the temperature control valve in a closed position.
Figure 3:
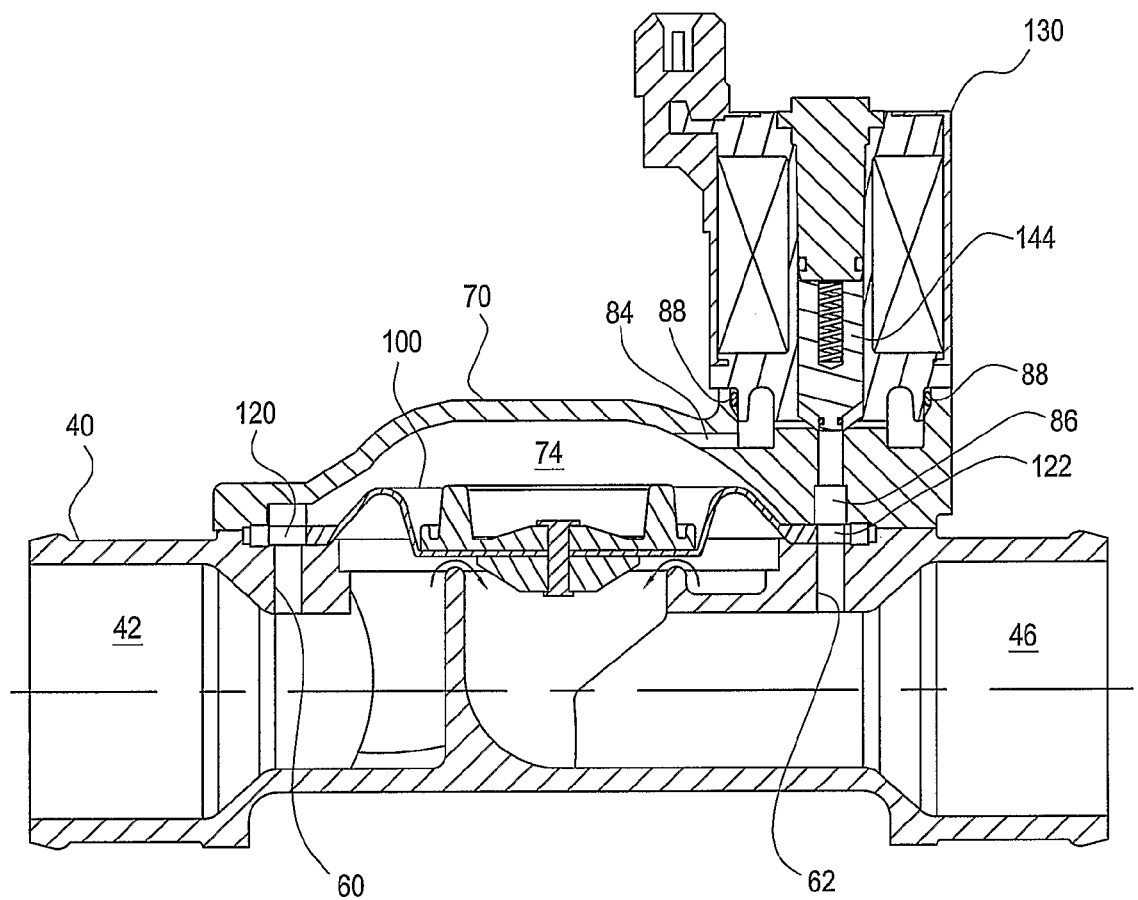
FIG. 3 is a sectional view showing the temperature control valve in an open position.

As shown in FIGS. 2-3, the temperature control valve 10 of the present invention includes a valve body 40, a cover 70, a first valve assembly or flexible valve 100, and a second valve assembly or solenoid valve 130. The valve body 40 includes an inlet 42 and an outlet 46 for connecting the valve body 40 to the first liquid coolant supply line 16b and the second liquid coolant supply line 16c of the automotive cooling system 11, respectively.

The closed position and the open position of the temperature control valve 10 correspond to a closed position and an open position of the flexible valve 100. The flexible valve 100 moves between the closed position (shown in FIG. 2), wherein the inlet 42 of the valve body 40 is not in fluid communication with the outlet 46 of the valve body 40, and the open position (shown in FIG. 3), wherein the inlet 42 of the valve body 40 is in fluid communication with the outlet 46 of the valve body 40.

When the flexible valve 100 is in the open position, a first flow path is defined between the inlet 42 of the valve body 40 and the outlet 46 of the valve body 40. The first flow path is the primary flow path through the temperature control valve 10, and the flow of the liquid coolant 15 along the first flow path operates to supply the liquid coolant 15 to the engine 12 by way of the second liquid coolant supply line 16c to regulate the temperature of the engine 12. The flexible valve 100 moves between the closed position and the open position in response to fluid pressure acting upon the flexible valve 100. More particularly, the cover 70 is sealingly connected to the valve body 40, and the flexible valve 100 is captured between the valve body 40 and the cover 70, forming a chamber 74 adjacent to the flexible valve 100. By regulating the fluid pressure within the chamber 74, the flexible valve 100 may be moved between the closed position and the open position.

In order to regulate pressure within the chamber 74, the temperature control valve 10 is operable to selectively permit fluid communication between the inlet 42 and the outlet 46 through the chamber 74 using the solenoid valve 130. As will be explained in detail herein, the chamber 74 is in fluid communication with the inlet 42 of the valve body 40 through a first flow port 60 formed in the valve body 40 and is in fluid communication with the outlet 46 of the valve body 40 through a second flow port 62 formed in the valve body 40. Thus, the solenoid valve 130 is movable between a closed position (shown in FIG. 2), wherein the chamber 74 is not in fluid communication with the outlet 46 of the valve body 40 through the second flow port 62, and an open position (shown in FIG. 3), wherein the chamber 74 is in fluid communication with the outlet 46 of the valve body 40 through the second flow port 62 of the valve body 40. When the solenoid valve 130 is in the open position, the first flow port 60 in the valve body 40, the chamber 74, and the second flow port 62 in the valve body 40 cooperate to define a second flow path between the inlet 42 and the outlet 46 of the valve body 40. The second flow path operates to regulate fluid pressure within the chamber 74 and does not, by itself, supply the liquid coolant to the engine 12 in quantities sufficient to regulate the temperature of the engine 12.

Figure 4:
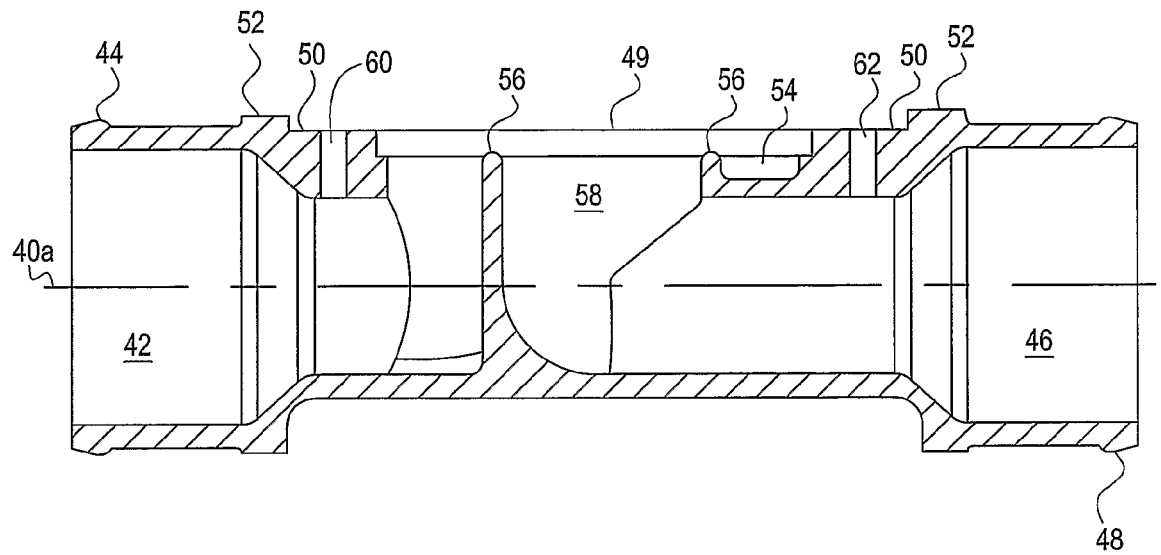
FIG. 4 is a sectional view showing a valve body of the temperature control valve.

As best seen in FIG. 4, the valve body 40 is roughly tubular in shape, wherein the inlet 42 and the outlet 46 are disposed on opposite ends of the valve body 40. The valve body 40 receives fluid, such as the liquid coolant 15, by connecting a coolant line, such as the first liquid coolant supply line 16b (not shown in FIG. 4) to the inlet 42, for example, by inserting an inlet fitting 44 of the valve body 40 into an open end of the first liquid coolant supply line 16b. Similarly, an outlet fitting 48 is provided on the exterior of the valve body 40 adjacent to the outlet 46 for insertion into a coolant line, such as the second liquid coolant supply line 16c (not shown in FIG. 4) of the automotive cooling system 11.

To allow the flexible valve 100 to be received in engagement with the valve body 40, an intermediate opening 49 is formed on the periphery of the valve body 40 between the inlet 42 and the outlet 46 of the valve body 40. The intermediate opening 49 of the valve body 40 is in fluid communication with both the inlet 42 and the outlet 46 of the valve body 40. The intermediate opening 49 of the valve body 40 is surrounded by a substantially circular first rim 50 and a substantially circular second rim 52, where the first rim 50 and the second rim 52 cooperate to define a stepped profile. Thus, the second rim 52 is radially outward from the first rim 50, and the second rim 52 is disposed further from a longitudinal axis 40a of the valve body 40 by a distance substantially equal to the thickness of the flexible valve 100. The first rim 50 is adapted to be engaged with the flexible valve 100, while the second rim 52 is adapted to engage the cover 70, such that the flexible valve 100 is retained between the valve body 40 and the cover 70. In order to permit or deny fluid communication of the inlet 42 of the valve body 40 with the outlet 46 of the valve body 40 in response to movement of the flexible valve 100 with respect to the valve body 40, the flexible valve 100 is selectively engageable with a circular rim 56, which surrounds a tubular opening 58 that is formed near the center of the intermediate opening 49 and is in fluid communication with the outlet 46. Radially outward from the circular rim 56, a circular channel 54 substantially surrounds the circular rim 56 and is in fluid communication with the inlet 42. The circular channel 54 functions to allow the liquid coolant 15 supplied to the inlet 42 of the valve body 40 to exert fluid pressure upon the flexible valve 100.

To provide fluid communication between the inlet 42 and the outlet 46 of the valve body through the chamber 74 along the second flow path, the first flow port 60 and the second flow port 62 are provided. The first flow port 60 extends substantially radially between the inlet 42 of the valve body 40 and the first rim 50. The second flow port 62 extends substantially radially between the outlet 46 of the valve body 40 and the first rim 50.

Figure 5:
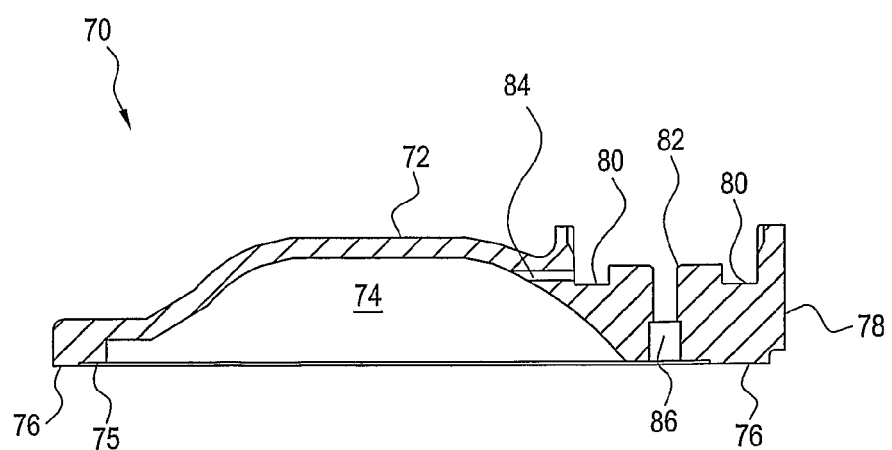
FIG. 5 is a sectional view showing a cover of the temperature control valve.

In order to seal the valve body 40 at the intermediate opening and to form the chamber 74 adjacent to the flexible valve 100, the temperature control valve 10 includes the cover 70, as best seen in FIG. 5. The cover 70 is adapted to be connected to the valve body 40 at the intermediate opening 49 of the valve body 40 and includes a substantially semi-spherical domed portion 72 toward the middle of the cover 70. The domed portion 72 of the cover 70 serves to provide space within the cover 70 to form the chamber 74. A substantially circular rim 75 substantially surrounds the domed portion 72 of the cover 70, which serves to engage the flexible valve 100 opposite the first rim 50 of the valve body 40. Outward from the rim 75, a flange 76 is formed on the cover 70 for engagement with the second rim 52 of the valve body 40. Portions of the rim 75 and the flange 76 of the cover 70 are formed on an end portion 78 of the cover 70.

The end portion 78 of the cover 70 is adapted to be connected to the solenoid valve 130. A valve seat 82 is formed on the end portion 78 of the cover 70 for selective engagement with the armature 144 of the solenoid valve 130. The valve seat 82 is in fluid communication with a circular channel 80 that surrounds the valve seat 82, and the valve seat 82 is also in fluid communication with the second flow port 62 of the valve body 40 through a valve flow port 86. The circular channel 80 is in fluid communication with the chamber 74 through a chamber flow port 84. To seal the cover 70 with respect to the solenoid valve 130, an O-ring 88 is provided on the end portion 78 of the cover 70 around the outer periphery of the circular channel 80.

Figure 6:
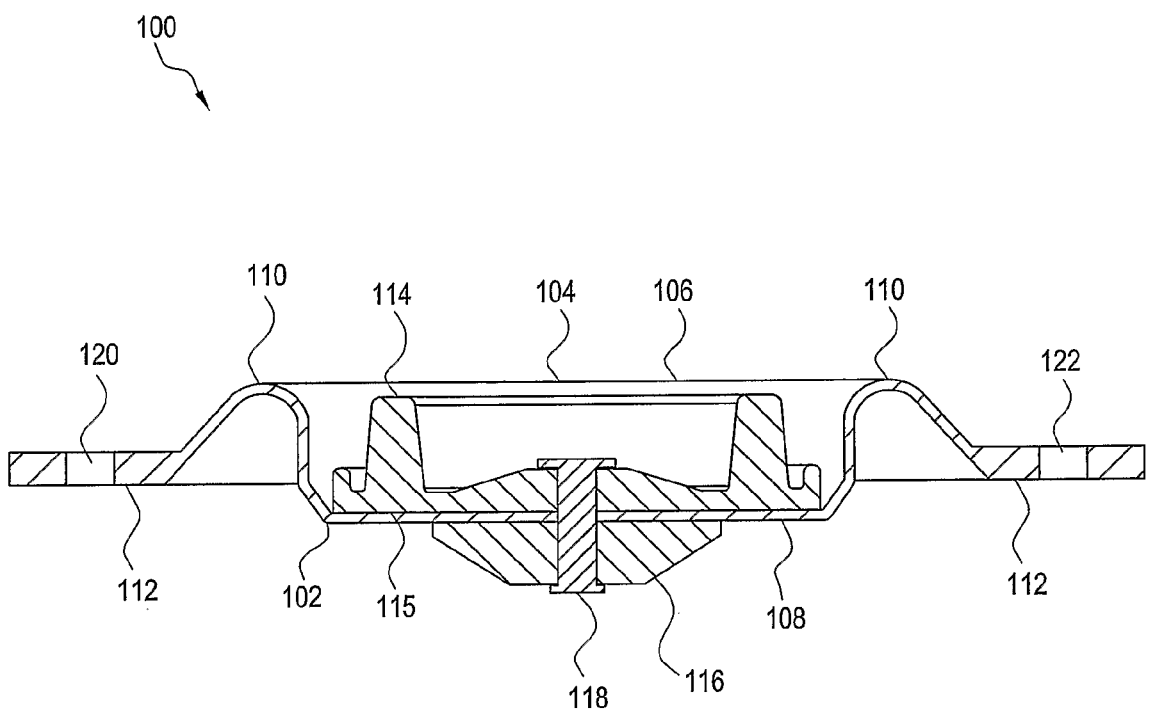
FIG. 6 is a sectional view showing a flexible valve assembly of the temperature control valve.

In order to open and close the temperature control valve 10 in response to fluid pressure within the chamber 74, the flexible valve 100 has a first or lower side 102 and a second or upper side 104, as best seen in FIG. 6. The lower side 102 of the flexible valve 100 is adapted to face the circular channel 54 and the tubular opening 58 of the valve body 40. The upper side 104 of the flexible valve 100 is adapted to face the chamber 74 formed by the cover 70.

The primary portion of the flexible valve 100 is a flexible or semi-flexible diaphragm 106. The diaphragm 106 is fabricated from rubber or other suitable conventional flexible or semi-flexible materials. The diaphragm 106 is substantially circular and includes a substantially planar central portion that is surrounded by a curved or rolled intermediate portion 110 that is disposed radially outward and radially adjacent to the central portion 108 of the diaphragm 106. Further radially outward and adjacent to the intermediate portion 110 of the diaphragm 106 is an outer rim 112 of the diaphragm 106.

A valve plate 114 and a retainer 116 are connected to the central portion 108 of the diaphragm 106 by a fastener, such as a rivet 118. The valve plate 114, the retainer 116, and the rivet 118 are all located near the center of the diaphragm 106. The valve plate 114 of the flexible valve 100 is a substantially circular member that is disposed on the upper side 104 of the flexible valve 100 and has a substantially planar engagement surface 115 that engages the central portion 108 of the diaphragm 106. The valve plate 114 is larger in diameter than the tubular opening 58 and the circular rim 56 of the valve body 40.

The retainer 116 of the flexible valve 100 serves to hold the valve plate 114 in place with respect to the diaphragm 106. Thus, the valve plate 114 is disposed on the upper side 104 of the flexible valve 100 in engagement with the central portion 108 of the diaphragm 106. The retainer 116 is smaller in diameter than the tubular opening 58 of the valve body 40, so that the retainer 116 may be disposed within the tubular opening 58 of the valve body 40 when the flexible valve 100 is in the closed position. The rivet 118 extends through the valve plate 114 of the diaphragm 106 and the retainer 116 to connect the valve plate 114 and the retainer 116 in a fixed position with respect to the diaphragm 106.

To allow the flexible valve 100 to move with respect to the valve body 40 in response to fluid pressure within the chamber 74, intermediate portion 110 of the diaphragm 106 begins just radially outward from the valve plate 114. The curved or rolled profile of the intermediate portion 110 of the diaphragm 106 allows the central portion 108 of the diaphragm 106 to move upward and downward with respect to the outer rim 112 of the flexible valve 100. Thus, when the flexible valve 100 is in the closed position, the valve plate 114 holds the central portion 108 of the diaphragm 106 in engagement with the circular rim 56 of the valve body 40 to create a barrier between the circular channel 54 and the tubular opening 58 of the valve body 40, thereby preventing fluid communication between the inlet 42 and the outlet 46 by way of the tubular opening 58. The outer rim 112 remains fixed with respect to the valve body 40 and the cover 70 to allow the fluid pressure in the chamber 74 to move the central portion 108 of the flexible valve 100. More particularly, the outer rim 112 of the flexible valve 100 is captured between the first rim 50 of the valve body 40 and the rim 75 of the cover 70. In order to allow fluid communication between the first flow path 60 of the valve body 40 and the chamber 74, a first aperture 120 is formed through the outer rim 112 of the diaphragm 106 and is adapted to be in alignment with the first flow port 60 of the valve body 40. Similarly, a second aperture 122 is formed through the outer rim 112 of the diaphragm 106 and is adapted to be aligned with the valve flow port 86 of the cover 70 and the second flow port 62 of the valve body 40.

Figure 7:
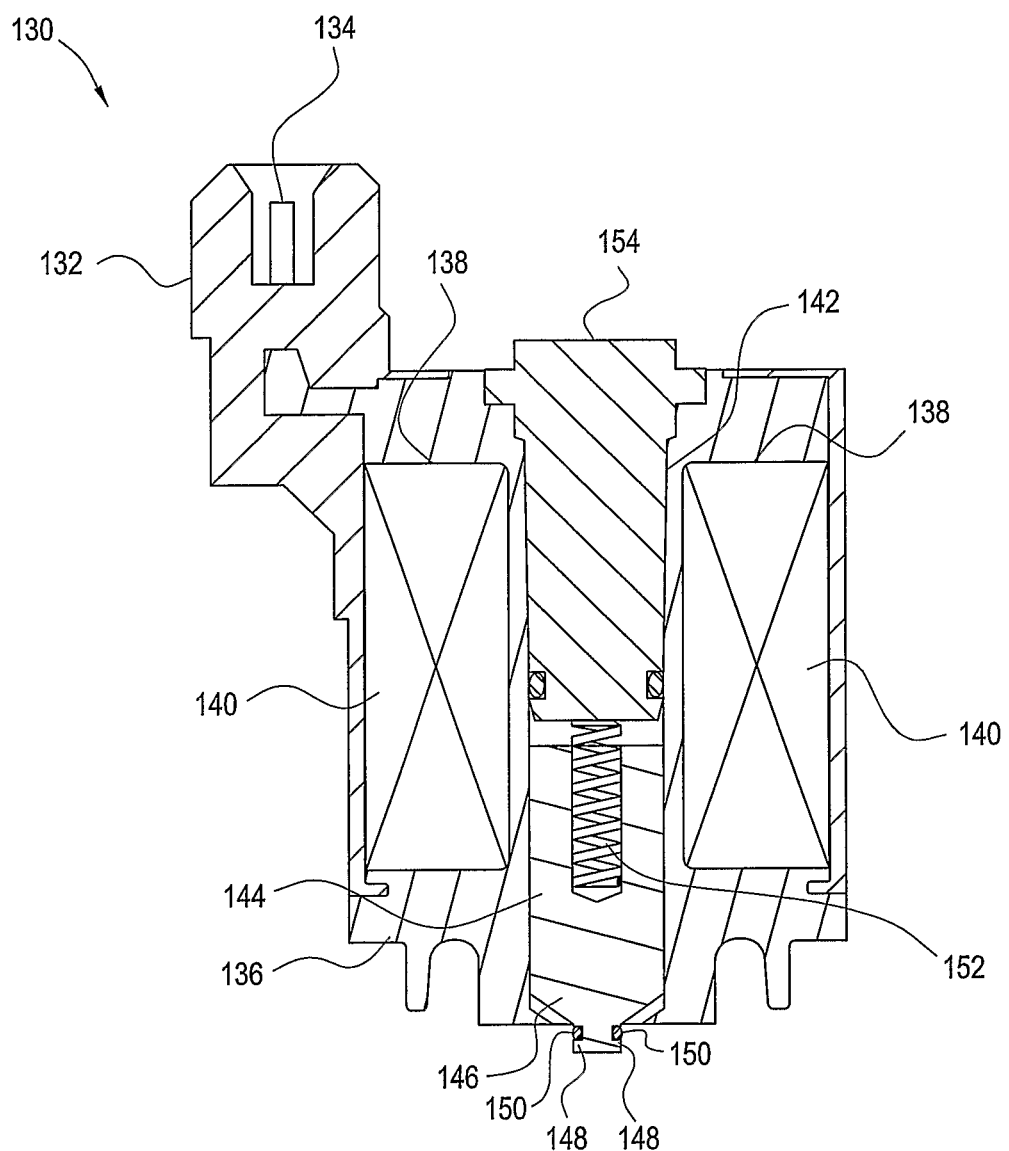
FIG. 7 is a sectional view showing a solenoid valve assembly of the temperature control valve.

Pressure within the chamber 74 is regulated by the solenoid valve 130, as shown in FIG. 7. The solenoid valve 130 includes a conventional, electrically-operated solenoid having a housing 132 on which an electrical terminal 134 is provided. The electrical terminal 134 is connectable to the communication line 20 of the automotive cooling system 11 for control of the solenoid valve 130 by the ECU 18. A body portion 136 is disposed within the housing 132 and includes a central bore 142 and a spool portion 138 that surrounds the central bore 142. A coil 140 is in electrical communication with the electrical terminal 134 and is disposed upon the spool portion 138 of the body portion 136 of the solenoid valve 130. The coil 140 is a conventional coil of electrically-conductive wire or other material operable to create a magnetic field.

In order to open and close the solenoid valve 130, armature 144 is slidably disposed within the central bore 142. The armature 144 is fabricated from a ferromagnetic material, such that it moves along the central bore 142 in response to energization and de-energization of the coil 140. The range of motion of the armature 144 within the central bore 142 is limited by a plug 154 that is disposed within the central bore 142 of the body portion 136 in threaded engagement with the body portion 136. A spring 152 is disposed between the plug 154 and the armature 144 to bias the armature 144 away from the plug 154. Furthermore, in order to seal the head portion 146 of the armature 144 with respect to the valve seat 82 of the cover 70, an annular channel is formed around the periphery of the head portion 146, and an O-ring 150 is disposed within the annular channel 148.

The solenoid valve 130 moves between the open position and the closed position in response to energization and de-energization of the coil 140 of the solenoid valve 130. When the coil 140 of the solenoid valve 130 is not energized, the spring 152 biases a head portion 146 of the armature 144 into engagement with the valve seat 82 of the cover 70 to define the closed position of the solenoid valve 130, wherein the chamber flow port 84 of the cover 70 is not in fluid communication with the valve flow port 86 of the cover 70. Thus, in the closed position of the solenoid valve 130, the inlet 42 of the valve body 40 is not in fluid communication with the outlet 46 of the valve body 40 by way of the chamber 74 along the second flow path. When the solenoid valve 130 is in the closed position, sealed engagement of the armature 144 with respect to the valve seat 82 is provided by an O-ring 150 that is disposed within an annular channel 148 that is formed on the periphery of the head portion 146 of the armature 144. When the armature 144 of the solenoid valve 130 is energized, the armature 144 overcomes the biasing force of the spring 152 and moves along the central bore 142 of the body portion 136 of the solenoid valve 130 until further movement of the armature 144 along the central bore 142 is restrained by engagement of the armature 144 with the plug 154. While the coil 140 of the solenoid valve 130 remains energized, the head portion 146 of the armature 144 disengages the valve seat 82 of the cover 70, thus defining the open position of the solenoid valve 130. In the open position of the solenoid valve 130, the chamber flow port 84 of the cover 70 is in fluid communication with the valve flow port 86 of the cover 70, thereby opening the second flow path between the inlet 42 and the outlet 46 of the valve body 40 through the chamber 74. While the solenoid valve 130 has been described as having a normally-closed operation, it should be understood that the invention is not necessarily limited in this manner. Rather, the spring 152 could be configured to bias the armature 144 toward the plug so that the head portion 146 of the armature 144 does not engage the valve seat 82 of the cover 70 when the coil 140 of the solenoid valve 130 is not energized, thus causing the solenoid valve 130 to operate in a normally-open manner.

In operation, the temperature control valve 10 moves between the closed position and the open position in response to signals from the ECU 18 to regulate the temperature of the engine 12. When the ECU 18 determines that the liquid coolant 15 should be supplied to the engine 12 to reduce the temperature of the engine 12, the ECU 18 causes the temperature control valve 10 to move from the closed position to the open position. Initially, the flexible valve 100 and the solenoid valve 130 of the temperature control valve 10 are both in the closed positions, and fluid flow is blocked along both the first flow path and the second flow path. In order to move the temperature control valve 10 from the closed position to the open position, the ECU 18 energizes the coil 140 of the solenoid valve 130 by way of the communication line 20. When the coil 140 of the solenoid valve 130 becomes energized, the armature 144 moves such that the head portion 146 of the armature 144 disengages the valve seat 82 of the cover 70, thus placing the solenoid valve 130 in the open position. With the solenoid valve 130 in the open position, fluid communication is established between the inlet 42 and the outlet 46 of the valve body 40 along the second flow path, and thus, the fluid pressure within the chamber 74 is reduced. In response to the reduced fluid pressure in the chamber 74, the flexible valve 100 moves to the open position by disengaging the circular rim 56 of the valve body 40, thus establishing fluid communication between the inlet 42 and the outlet 46 along the first flow path to establish supply of the liquid coolant 15 to the engine 12.

When the ECU 18 determines that the temperature of the engine 12 no longer needs to be reduced, for example, when the ECU 18 determines that the temperature signal provided by the temperature sensor 22 corresponds to a temperature that is lower than a predetermined temperature, the ECU 18 stops the flow of the liquid coolant 15 to the engine 12 by moving the temperature control valve 10 from the open position to the closed position. Initially, the flexible valve 100 and the solenoid valve 130 of the temperature control valve 10 are in the open positions, and the inlet 42 and the outlet 46 of the valve body 40 are in fluid communication with one another by way of both the first flow path and the second flow path. The ECU 18 moves the solenoid valve 130 from the open position to the closed position by de-energizing the coil 144 of the solenoid valve 130 by way of the communication line 20 between the ECU 18 and the solenoid valve 130. Once the coil 140 of the solenoid valve 130 is de-energized, the spring 152 of the solenoid valve 130 biases the armature 144 of the solenoid valve 130, such that the head portion 146 and the O-ring 150 of the armature 144 engage the valve seat 82 of the cover 70, thus establishing the closed position of the solenoid valve 130. With the solenoid valve 130 in the closed position, fluid communication between the inlet 42 and the outlet 46 of the valve body 40 by way of the chamber 74 through the second flow path is blocked, causing the pressure within the chamber 74 to increase. In response to the increased pressure within the chamber 74, the flexible valve 100 moves into engagement with the circular rim 56 of the valve body 40, thus defining the closed position of the flexible valve 100 and blocking fluid communication of the inlet 42 of the valve body 40 with the outlet 46 of the valve body 40 over the first flow path, thus defining the closed position of the temperature control valve 10.

While the invention has been described in connection with what is presently considered to be the most practical and preferred embodiment, it is to be understood that the invention is not to be limited to the disclosed embodiments, but to the contrary, it is intended to cover various modifications and equivalent arrangements included within the spirit and scope of the appended claims. The scope is to be accorded the broadest interpretation so as to encompass all such modifications and equivalent structures as is performed under the law.

What is claimed is:

1. A temperature control valve 10 for regulating a flow of coolant 15 in an automotive cooling system 11 that includes an engine 12 and a radiator 14, the temperature control valve 10 comprising:
   a valve body 40 having an inlet 42 and an outlet 46;
   a first valve assembly 100 that is moveable between a closed position, wherein the inlet 42 is not in fluid communication with the outlet 46, and an open position, wherein the inlet 42 is in fluid communication with the outlet 46;
   a chamber 74 adjacent to the first valve assembly 100, wherein a fluid pressure within the chamber 74 moves the first valve assembly 100 between the open position and the closed position;
   a second valve assembly 130 configured to regulate the fluid pressure within the chamber 74 to thereby move the first valve assembly 100 between the open position and the closed position; and
   a fuel type sensor 26 to detect the type of fuel used by the engine 12 and provide a fuel type signal, wherein the second valve assembly 130 regulates the fluid pressure within the chamber 74 based at least in part on the fuel type signal.

2. The temperature control valve of claim 1, further comprising:
   a first flow port 60 formed in the valve body 40 to provide fluid communication between the inlet 42 and the chamber 74; and
   a second flow port 62 formed in the valve body 40 to provide fluid communication between the outlet 46 and the second valve assembly 130.

3. The temperature control valve of claim 2, wherein the second valve assembly 130 moves between a closed position, wherein the chamber 74 is not in fluid communication with the outlet 46 through the second flow port, and an open position, wherein the chamber 74 is in fluid communication with the outlet 46 through the second flow port 62.

4. The temperature control valve of claim 1, wherein the first valve assembly 100 has a first side 102 adjacent to the inlet 42 and the outlet 46, and a second side 104 adjacent to the chamber 74.

5. The temperature control valve of claim 1, wherein the first valve assembly includes a flexible diaphragm 106.

6. The temperature control valve of claim 5, wherein the second valve assembly 130 includes an electrically-operated valve.

7. The temperature control valve of claim 6, further comprising:
   a temperature sensor 22 to detect the temperature of the engine 12 and provide a temperature signal; and
   an electronic control unit 18 in electrical communication with the second valve assembly 130 and the temperature sensor 22, wherein the electronic control unit 18 moves the second valve assembly 130 between the open and closed positions to control the temperature of the engine 12 in response to the temperature signal.

8. A temperature control valve 10 for regulating a flow of coolant 15 in an automotive cooling system 11 that includes an engine 12 and a radiator 14, the temperature control valve 10 comprising:
   a valve body 40 having an inlet 42 and an outlet 46;
   a first valve assembly 100 that is moveable between a closed position, wherein the inlet 42 is not in fluid communication with the outlet 46, and an open position, wherein the inlet 42 is in fluid communication with the outlet 46, and the first valve assembly includes a flexible diaphragm 106;
   a chamber 74 adjacent to the first valve assembly 100, wherein a fluid pressure within the chamber 74 moves the first valve assembly 100 between the open position and the closed position;
   a second valve assembly 130 configured to regulate the fluid pressure within the chamber 74 to thereby move the first valve assembly 100 between the open position and the closed position, wherein the second valve assembly 130 includes an electrically-operated valve;
   a temperature sensor 22 to detect the temperature of the engine 12 and provide a temperature signal;
   an electronic control unit 18 in electrical communication with the second valve assembly 130 and the temperature sensor 22, wherein the electronic control unit 18 moves the second valve assembly 130 between the open and closed positions to control the temperature of the engine 12 in response to the temperature signal; and
   a fuel type sensor 26 to detect the type of fuel used by the engine 12 and provide a fuel type signal, the fuel type sensor 26 in electrical communication with the electronic control unit 18, wherein the electronic control unit moves the second valve assembly 130 between the open and closed positions to control the temperature of the engine 12 within either a first operating temperature range or a second operating temperature range, wherein the electronic control unit 18 selects either the first operating temperature range or the second operating temperature range based on the fuel type signal.

9. The temperature control valve of claim 1, further comprising:
   the valve body 40 having a rim 56 at an interface between the inlet 42 and the outlet 46;
   the first valve assembly 100 having a flexible valve 106 having a first side 102 and a second side 104, wherein the first side of the flexible valve 106 sealingly engages the rim 56 of the valve body 40 to block fluid communication between the inlet 42 and the outlet 46 when the first valve 100 is in the closed position, and the first side 102 of the flexible valve 106 does not engage the rim 56 of the valve body 40 when the first valve 100 is in the open position, wherein the chamber 74 is adjacent to and in fluid communication with the second side 104 of the flexible valve 106.

10. The temperature control valve of claim 9, further comprising:
   a first flow port 60 formed in the valve body 40 to provide fluid communication between the inlet 42 and the chamber 74; and
   a second flow port 62 formed in the valve body 40 to provide fluid communication between the outlet 46 and the second valve assembly 130.

11. The temperature control valve of claim 10, wherein the second valve assembly 130 moves between a closed position, wherein the chamber 74 is not in fluid communication with the outlet 46 through the second flow port 62, and an open position, wherein the chamber 74 is in fluid communication with the outlet 46 through the second flow port 62.

12. The temperature control valve of claim 11, further comprising:
   the second valve assembly including an electrically-operated valve;
   a temperature sensor 22 to detect the temperature of the engine 12 and provide a temperature signal; and
   an electronic control unit 18 in electrical communication with the electrically-operated valve of the second valve assembly 130 and the temperature sensor 22, wherein the electronic control unit 18 moves the electrically-operated valve 130 between the open and closed positions to control the temperature of the engine 12 in response to the temperature signal.

13. A temperature control valve 10 for regulating a flow of coolant 15 in an automotive cooling system 11 that includes an engine 12 and a radiator 14, the temperature control valve 10 comprising:
   a valve body 40 having an inlet 42 and an outlet 46;
   a first valve assembly 100 that is moveable between a closed position, wherein the inlet 42 is not in fluid communication with the outlet 46, and an open position, wherein the inlet 42 is in fluid communication with the outlet 46;
   a temperature sensor 22 to detect the temperature of the engine 12 and provide a temperature signal;
   a fuel type sensor 26 to detect the type of fuel used by the engine 12 and provide a fuel type signal; and
   an electronic control unit 18 that is in electrical communication with the temperature sensor and the fuel type sensor and is operable to cause the first valve assembly to move between the open position and the closed position to control the temperature of the engine 12 within an operating temperature range that is selected by the electronic control unit 18 based at least in part on the fuel type signal.

14. A method for regulating a flow of coolant in an automotive cooling system 11 that includes an engine 12 and a radiator 14, the method comprising the steps of:
   providing a temperature control valve 10 having a first valve assembly 100 to selectively open and close a first flow path between an inlet 42 and an outlet 46 to selectively provide the flow of coolant 15 to the engine 12 and a second valve assembly 130 to selectively open and close a second flow path between an inlet 42 and an outlet 46, the second flow path in fluid communication with the first valve assembly 100 such that the first valve assembly 100 opens when the second valve assembly 130 is opened and the first valve assembly 100 closes when the second valve assembly 130 is closed;
   detecting the temperature of the engine 12;
   controlling the temperature of the engine 12 based on the temperature of the engine 12 by selectively opening and closing the second valve assembly 130; and
   detecting the type of fuel used by the engine 12; and
   controlling the temperature of the engine 12 in either a first operating temperature range or a second operating temperature range based on the type of fuel used by the engine 12.

15. The method of claim 14, further comprising the steps of:
   providing the first valve assembly 100 having a pressure operated valve; and
   providing the second valve assembly 130 having an electrically-operated valve.

16. The method of claim 15, further comprising the steps of:
   providing a temperature sensor 22 to detect the temperature of the engine 12 and provide a temperature signal to perform the step of detecting the temperature of the engine 12; and
   providing an electronic control unit 18 in electrical communication with the electrically-operated valve of the second valve assembly 130 and the temperature sensor 22, and controlling the temperature of the engine 12 based on the temperature of the engine by selectively opening and closing the electrically-operated valve of the second valve assembly 130 using the electronic control unit 18, wherein the electronic control unit 18 moves the electrically-operated valve of the second valve assembly 130 between the open and closed positions to control the temperature of the engine 12 in response to the temperature signal.

17. The method of claim 15, further comprising the step of:
   providing the temperature control valve 100 having a chamber 74 in fluid communication with the pressure operated valve 100 and the second flow path, wherein opening and closing the electrically operated valve of the second valve assembly 130 regulates pressure within the chamber 74 and the pressure operated valve 100 opens and closes in response to pressure within the chamber 74.

18. The method of claim 15, further comprising the steps of:
   providing the pressure operated valve 100 having a flexible diaphragm 106; and
   providing the electrically operated valve of the second valve assembly 130 having a solenoid 140, 144.

* * * * *